(12) United States Patent
Tetsuka et al.

(10) Patent No.: US 9,150,275 B2
(45) Date of Patent: Oct. 6, 2015

(54) HYDRAULIC CONNECTOR ARRANGEMENT

(75) Inventors: Toshio Tetsuka, Hyogo (JP); Kenji Nakahara, Osaka (JP)

(73) Assignee: Shimano Inc., Osaka (JP)

( * ) Notice: Subject to any disclaimer, the term of this patent is extended or adjusted under 35 U.S.C. 154(b) by 208 days.

(21) Appl. No.: 12/640,773

(22) Filed: Dec. 17, 2009

(65) Prior Publication Data

US 2011/0148095 A1    Jun. 23, 2011

(51) Int. Cl.
*F16L 19/07*    (2006.01)
*B62L 1/10*    (2006.01)
*B60T 17/04*    (2006.01)
*B62L 3/02*    (2006.01)

(52) U.S. Cl.
CPC ............... *B62L 1/10* (2013.01); *B60T 17/043* (2013.01); *B62L 3/023* (2013.01)

(58) Field of Classification Search
CPC ...................................................... F16L 19/07
USPC ............ 285/190, 205, 204; 188/24.11, 24.21, 188/26, 344
See application file for complete search history.

(56) References Cited

U.S. PATENT DOCUMENTS

| | | | |
|---|---|---|---|
| 608,852 A * | 8/1898 | Goss | ............................. 285/190 |
| 1,499,851 A | 7/1924 | Brown, Jr. | |
| 2,845,282 A | 7/1958 | Mueller | |
| 3,007,485 A * | 11/1961 | Barker | ........................ 137/454.2 |
| 3,338,337 A * | 8/1967 | Freeland et al. | .............. 188/344 |
| 3,554,334 A * | 1/1971 | Shimano et al. | .............. 188/344 |
| 3,776,333 A * | 12/1973 | Mathauser | ..................... 188/344 |
| 3,899,056 A * | 8/1975 | Doerr | ............................. 188/344 |
| 3,899,057 A * | 8/1975 | Carre | ............................. 188/351 |
| 3,993,174 A * | 11/1976 | Williams et al. | ............... 188/344 |
| 4,391,353 A * | 7/1983 | Mathauser | ................. 188/24.12 |
| 4,585,094 A * | 4/1986 | Rottenkolber et al. | ..... 188/24.22 |
| 4,585,256 A | 4/1986 | Rassieur et al. | |
| 4,615,415 A * | 10/1986 | Mathauser | ................. 188/24.22 |

(Continued)

FOREIGN PATENT DOCUMENTS

| DE | 122421 A1 | 10/1976 |
|---|---|---|
| DE | 298150 A5 | 2/1992 |

(Continued)

OTHER PUBLICATIONS

Jasper Engines & Transmissions, Technical Bulletin, Revised Studded Cylinder Head Bolts for 1990-1994 Cummins 10.0 & 11.0L, L10 & M11 Diesel Engines, Aug. 21, 2007. [online] [Retrieved on Feb. 27, 2014]. Retrieved from the internet: <URL: http://web.archive.org/web/20070715000000*/http://www.jasperengines.com/pdf/CumminsL103AM11HeadBolts.pdf>.*

*Primary Examiner* — Daniel P Stodola
*Assistant Examiner* — James Linford
(74) *Attorney, Agent, or Firm* — Global IP Counselors

(57) ABSTRACT

A hydraulic connector arrangement includes a shaft member, a banjo fitting, a pair of sealing members and a banjo fixing member. The shaft member has a hydraulic passageway and an opening that extends from the hydraulic passageway to an outer surface of the shaft member. The banjo fitting rotatably extends around the shaft member covering the opening. The pair of sealing members are disposed between the shaft member and the banjo member and on opposite sides of the opening. The banjo fixing member is coupled to the shaft member to retain the banjo fitting to the shaft member. Further, the banjo fixing member is dimensioned to allow rotation of the banjo relative to the shaft member and the banjo fixing member.

13 Claims, 6 Drawing Sheets

(56) References Cited

U.S. PATENT DOCUMENTS

| | | | | |
|---|---|---|---|---|
| 4,665,803 A | * | 5/1987 | Mathauser | 92/99 |
| 4,896,753 A | * | 1/1990 | Sule | 188/344 |
| 4,921,081 A | * | 5/1990 | Chilcote | 188/344 |
| 4,955,643 A | * | 9/1990 | Bona et al. | 285/190 |
| 5,188,200 A | * | 2/1993 | Modolo | 188/24.11 |
| 5,228,725 A | * | 7/1993 | Aoyagi et al. | 285/141.1 |
| 5,372,389 A | * | 12/1994 | Tam et al. | 285/94 |
| 5,403,042 A | * | 4/1995 | Negron | 285/12 |
| 5,443,134 A | * | 8/1995 | Gajek et al. | 188/344 |
| 5,516,156 A | | 5/1996 | Williamson | |
| 5,516,157 A | | 5/1996 | Williamson | |
| 5,678,665 A | * | 10/1997 | Debreczeni | 188/344 |
| 5,690,192 A | * | 11/1997 | Kuo | 188/24.22 |
| 6,007,109 A | | 12/1999 | Schoetz | |
| 6,202,802 B1 | * | 3/2001 | Nakamura | 188/71.6 |
| 6,312,020 B1 | * | 11/2001 | Ketcham et al. | 285/142.1 |
| 6,336,525 B1 | | 1/2002 | Leng | |
| 6,412,605 B2 | * | 7/2002 | Campagnolo | 188/24.11 |
| 6,688,440 B2 | | 2/2004 | Matsushita et al. | |
| 6,804,961 B2 | | 10/2004 | Lumpkin | |
| 6,957,534 B2 | | 10/2005 | Lumpkin | |
| 7,178,646 B2 | | 2/2007 | Lumpkin | |
| 7,204,350 B2 | | 4/2007 | Lumpkin | |
| 7,226,088 B2 | | 6/2007 | Skiba et al. | |
| 7,318,502 B2 | * | 1/2008 | Costa | 188/24.22 |
| 7,530,435 B2 | | 5/2009 | Lumpkin | |
| 7,559,414 B2 | | 7/2009 | Lumpkin | |
| 7,575,105 B2 | | 8/2009 | Lumpkin | |
| 2001/0017244 A1 | * | 8/2001 | Campagnolo | 188/24.11 |
| 2004/0212193 A1 | * | 10/2004 | Johnstone | 285/390 |
| 2007/0046020 A1 | * | 3/2007 | Brass et al. | 285/98 |
| 2007/0209882 A1 | * | 9/2007 | Watari | 188/1.11 R |
| 2007/0283691 A1 | * | 12/2007 | Tetsuka et al. | 60/594 |
| 2008/0025656 A1 | | 1/2008 | Schutt et al. | |
| 2008/0116025 A1 | | 5/2008 | Lumpkin | |
| 2008/0271446 A1 | | 11/2008 | Lumpkin | |
| 2008/0310933 A1 | * | 12/2008 | Ricciardo | 411/161 |
| 2009/0000878 A1 | | 1/2009 | Lumpkin | |
| 2009/0072614 A1 | | 3/2009 | Ruckh et al. | |
| 2009/0262191 A1 | * | 10/2009 | Haynes et al. | 348/148 |

FOREIGN PATENT DOCUMENTS

| | | |
|---|---|---|
| DE | 19547891 A1 | 6/1997 |
| DE | 102005061903 A1 | 6/2007 |
| EP | 1 325 863 B1 | 7/2003 |
| EP | 1 498 347 A2 | 1/2005 |
| EP | 1 595 781 A2 | 11/2005 |
| EP | 1 595 782 A2 | 11/2005 |
| JP | 7-14399 Y2 | 4/1995 |
| JP | 10-30660 A | 2/1998 |
| TW | 547429 U | 8/2003 |
| TW | M307582 U | 3/2007 |
| WO | WO 2008036489 A1 * | 3/2008 |

* cited by examiner

HYDRAULIC CONNECTOR ARRANGEMENT

BACKGROUND

1. Field of the Invention

This invention generally relates to a hydraulic connector arrangement. More specifically, the present invention relates to a hydraulic connector arrangement for a bicycle hydraulic brake system.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide to a hydraulic connector arrangement that includes a hydraulic banjo connection rotatable about a shaft member.

Another aspect is to provide a hydraulic connector arrangement with a hydraulic banjo connection with seals disposed between a shaft member and the banjo.

Another aspect is to provide a hydraulic connector arrangement that includes a hydraulic banjo connection between a banjo connector and a shaft member that supports a bicycle hydraulic caliper assembly.

In view of the state of the known technology, a hydraulic connector arrangement includes a shaft member, a banjo, a pair of sealing members and a banjo fixing member. The shaft member has a hydraulic passageway and an opening that extends from the hydraulic passageway to an outer surface of the shaft member. The banjo fitting rotatably extends around the shaft member covering the opening. The pair of sealing members are disposed between the shaft member and the banjo member and on opposite sides of the opening. The banjo fixing member is attached to the shaft member to retain the banjo fitting to the shaft member. The banjo fixing member is also dimensioned to allow rotation of the banjo relative to the shaft member and the banjo fixing member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
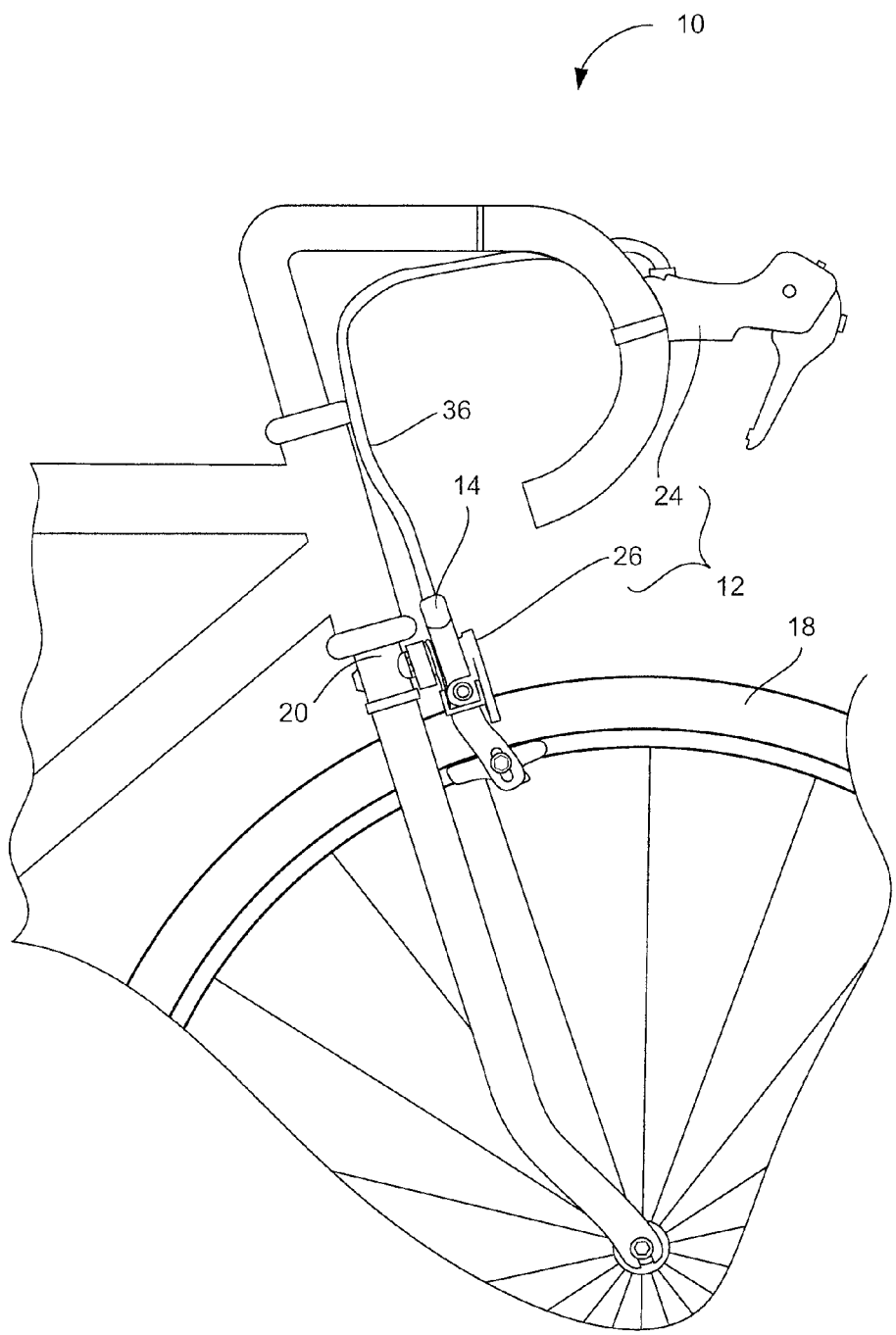
FIG. 1 is a side elevational view of a bicycle having a bicycle frame and a hydraulic brake system that is equipped with a hydraulic connector arrangement in accordance with a first embodiment.

Referring initially to FIG. 1, a bicycle 10 is illustrated with a hydraulic brake system 12 that includes a hydraulic connector arrangement 14 in accordance with a first embodiment. As shown in FIG. 1, the bicycle 10 also includes wheel 18 and a frame member 20.

Although only one wheel 18 (the front wheel) is depicted in FIG. 1, it should be understood from the drawings and the description herein that the bicycle 10 also includes a rear wheel with similar brake system features, including the hydraulic connector arrangement 14. Since features of both front and rear brake systems are the same, description of rear portions of the bicycle and rear portions of the hydraulic brake system are omitted for the sake of brevity.

Figure 2:
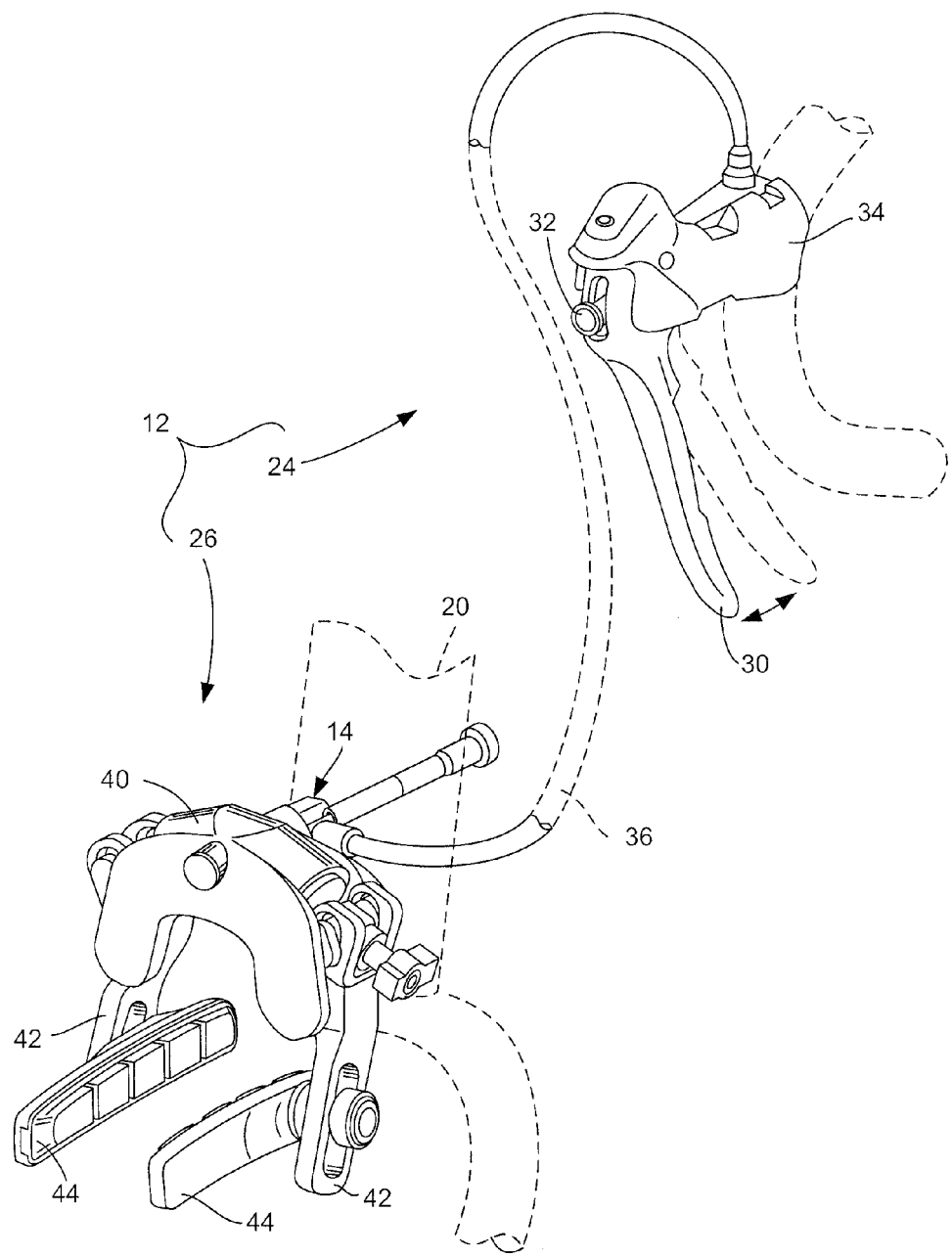
FIG. 2 is a perspective view of the hydraulic brake system showing a brake actuation device and a hydraulic brake caliper that is equipped with the hydraulic connector arrangement in accordance with the first embodiment.

As best shown in FIG. 2, the hydraulic brake system 12 includes a hydraulic brake actuation device 24 and a hydraulic brake caliper assembly 26.

The hydraulic brake actuation device 24 includes a lever 30, a hydraulic piston 32 and a housing 34. The lever 30 is pivotal about a pivot axis that extends through the housing 34. The lever 30 is therefore movable between an at rest position (solid lines) and a brake actuation position (phantom lines). The piston 32 and the lever 30 are coupled such that the piston 32 moves when the lever 30 moves. The piston 32 is partially disposed within a bore (not shown) within the housing 34. The bore of the housing 34 is filled with hydraulic fluid in a conventional manner.

Movement of the lever 30 and the piston 32 displaces hydraulic fluid within the hydraulic brake actuation device 24 producing hydraulic fluid pressure. The hydraulic fluid pressure is transmitted to the hydraulic brake caliper assembly 26 via a hydraulic line 36 in a conventional manner.

Figure 3:
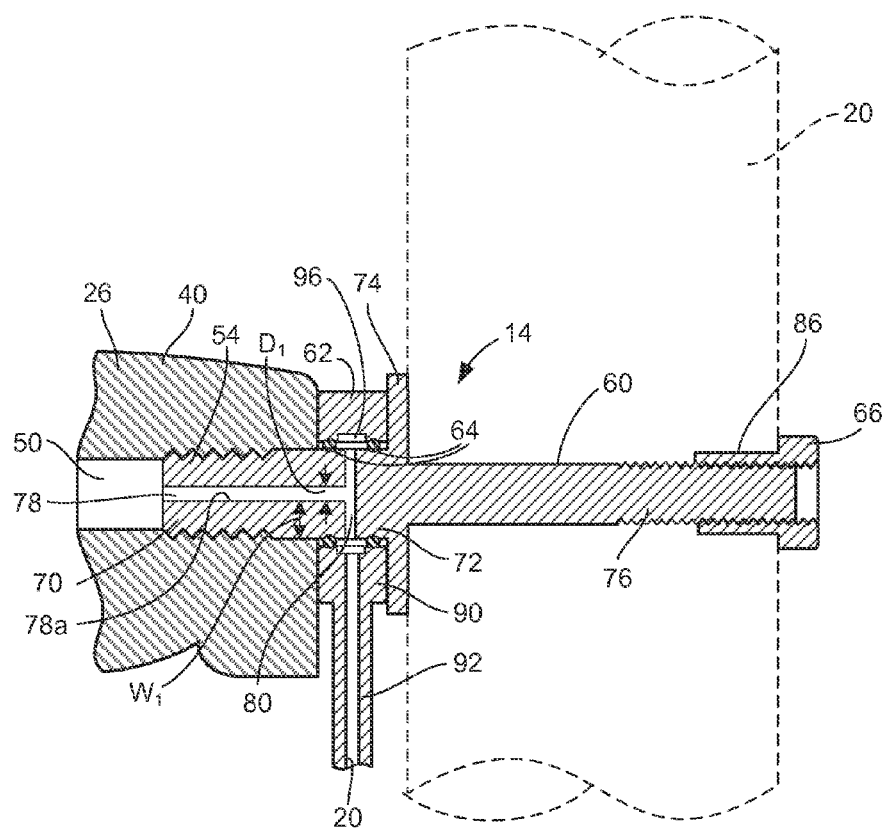
FIG. 3 is a cross-section of a bicycle frame, a portion of the hydraulic brake caliper and the hydraulic connector arrangement showing a shaft member and a banjo installed about the shaft member in accordance with the first embodiment.

With reference to FIGS. 2 and 3, a description of the hydraulic brake caliper assembly 26 is now provided. The hydraulic brake caliper assembly 26 includes a housing 40, a pair of brake arms 42 (FIG. 2 only) and a corresponding pair of brake shoes 44 (FIG. 2 only). As shown in FIG. 3, the housing 40 includes an internal fluid passageway 50. A portion of the internal fluid passageway 50 of the housing 40 includes machine threads 54.

The internal fluid passageway 50 is in fluid communication with the hydraulic connector arrangement 14, as is described in greater detail below. The internal fluid passageway 50 is also in fluid communication with a hydraulic piston arrangement (not shown) that causes the brake arms 42 to move between an at rest position and a brake engagement position (not shown) in a conventional manner. Specifically, hydraulic fluid pressure from the hydraulic brake actuation device 24 causes the brake arms 42 to move bringing the brake shoes 44 into contact with the wheel 18.

Figure 4:
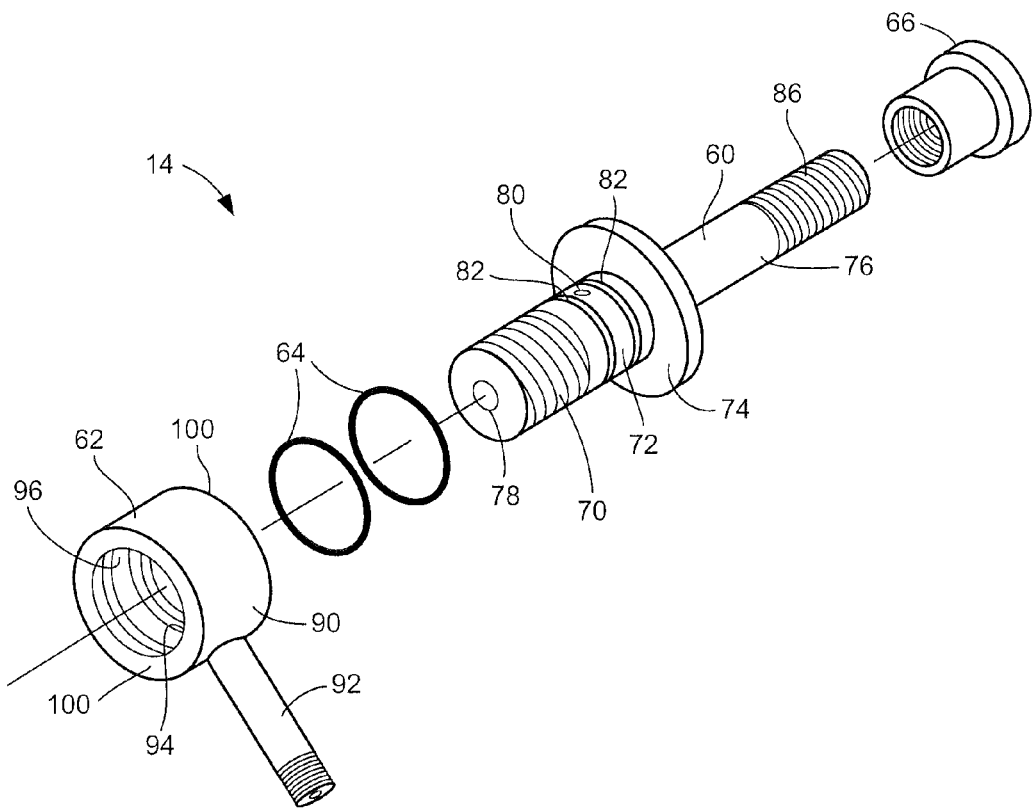
FIG. 4 is an exploded view of the hydraulic connector arrangement shown removed from the bicycle and the hydraulic brake caliper, showing the shaft member, the banjo, a pair of seals and a fixing nut in accordance with the first embodiment.

A description of the hydraulic connector arrangement 14 is now provided with specific reference to FIGS. 3 and 4. The hydraulic connector arrangement 14 basically includes a shaft member 60, a banjo fitting 62, sealing members 64 and a fastener 66.

The shaft member 60 is an elongated member that is dimensioned to support the hydraulic brake caliper assembly 26 to the frame member 20 of the bicycle 10. The shaft member 60 is also configured to direct the flow of hydraulic fluid between the hydraulic brake actuation device 24 and the hydraulic brake caliper assembly 26, as is described below.

The shaft member 60 basically includes a bicycle brake caliper supporting section 70, a banjo supporting section 72, a banjo fixing flange 74, a bicycle frame attachment section 76 and a hydraulic passageway 78.

The bicycle brake caliper supporting section 70 includes machine threads that mate with the machine threads 54 of the internal fluid passageway 50 of the housing 40. More specifically, the bicycle brake caliper supporting section 70 is dimensioned to screw into the internal fluid passageway 50 with sufficient strength to support the hydraulic brake caliper assembly 26 during the braking process.

The hydraulic passageway 78 is centered in the bicycle brake caliper supporting section 70 and is open to the internal fluid passageway 50. Thus, hydraulic fluid can pass between the internal fluid passageway 50 and the hydraulic passageway 78. More specifically, the hydraulic passageway 78 extends along a central axis of the shaft member 60. The hydraulic passageway 8 defines an inner surface 78a and has an inner diameter $_1$. The hydraulic passageway 78 also includes an opening 80 that extends from the hydraulic passageway 78 to an outer surface of the shaft member 60. The shaft member 60 has a wall thickness $W_1$ measured from the outer surface of the shaft member 60 to the inner surface 78a of the hydraulic passageway 78. As shown in FIG. 3 the wall thickness $W_1$ is greater than the inner diameter $D_1$. The opening 80 is formed by a bore that extends completely through the shaft member 60. Further, the opening 80 is located at the banjo supporting section 72. As well, the opening 80 extends perpendicularly from the hydraulic passageway 80.

The banjo supporting section 72 has an annular surface with a uniform outer diameter. The banjo supporting section 72 can additionally be formed with a pair of grooves 82 dimensioned to retain the seal members 62. However, it should be understood from the drawings and the description herein that the grooves 82 for retaining the seal member 62 are optional and are not required.

The banjo supporting section 72 is located between the bicycle brake caliper supporting section 70 and the bicycle frame attachment section 76 relative to the axial direction of the shaft member 60.

The banjo fixing flange 74 (a banjo fixing member) is coupled to the shaft member 60 to retain the banjo fitting 62 to the shaft member 60. The banjo fixing flange 74 is dimensioned to allow rotation of the banjo fitting 62 relative to the shaft member 60. The banjo fixing member 74 is formed integrally with the shaft member 60 as a single one-piece element. The banjo fixing member 74 is basically a radially extending abutment flange or annular disk shaped portion that is disposed adjacent to the banjo supporting section 72 and the opening 80.

The bicycle frame attachment section 76 is an elongated shaft section that is dimensioned to extend through a bore formed in the frame portion 20. The bicycle frame attachment section 76 has a threaded section 86 that is dimensioned to mate with internal threads of the fastener 66. In the first embodiment, the bicycle frame attachment section 76 is located adjacent to the banjo fixing flange 74 such that the banjo supporting section 72 is on one side of the banjo fixing flange 74 and the bicycle frame attachment section 76 is located on the other side of the banjo fixing flange 74.

As shown in FIGS. 3 and 4, the banjo fitting 62 includes an annular ring-shaped member 90 and a hose attachment section 92.

The annular ring-shaped member 90 of the banjo fitting 62 has a cylindrical shape with a central bore 94 that extends along a central axis of the banjo fitting 62. On an inner surface of the central bore 94 an annular hydraulic passageway 96 is formed. The annular hydraulic passageway 96 is basically an annular recess formed within the bore 94. The annular hydraulic passageway 96 has a diameter that is greater than the diameter of the bore 94, as indicated in FIG. 3. When the banjo fitting 62 is installed to the shaft member 60 and the banjo supporting section 72, the annular passageway 96 encircles the shaft member 60. More specifically, the banjo fitting 62 rotatably extends around the shaft member 60 covering the opening 80. Further, the annular hydraulic passageway 96 is in fluid communication with the opening 80 in the shaft member 60 with the banjo fitting 62 installed to the shaft member 60.

The hose attachment section 92 extends radially from the banjo fitting 62 and is integrally formed as a one piece element with the banjo fitting 62. The hose attachment section 92 extends in a direction perpendicular to an axial direction of the shaft member 60 with the banjo fitting 62 installed to the shaft member 60. The hose attachment section 92 has a central fluid passageway 98. The hydraulic line 36 is connected to the hose attachment section 92 in a conventional manner. Thus, fluid pressure from the hydraulic brake actuation device 24 is transmitted through the hydraulic line 36, the central passageway 98, the annular hydraulic passageway 96, the opening 80, the hydraulic passageway 78 and finally to the internal fluid passageway 50 of the hydraulic brake caliper assembly 26.

Although not shown, the central bore 94 of the banjo fitting 62 can include recesses or concave annular shaped grooves that retain the sealing members 64. Further, annular axial end faces 100 (FIG. 4) of the banjo fitting 62 can be coated with a friction resistant material.

The sealing members 64 are depicted as, for example, polymer O-rings. However, it should be understood from the drawings and the description herein that the sealing members 64 can have any of a variety of shapes and can be made of any of a variety of resilient materials. For example, if O-rings are used for the sealing members 64, the O-rings have a circular shape when viewed in cross-section in FIG. 3. The sealing members 64 can also be provided with a square, rectangular or elliptical shape when viewed in cross-section.

The banjo fitting 62 is installed on the banjo supporting section 72 of the shaft member 60 with the sealing members 64 disposed between the banjo supporting section 72 and the surface of the central bore 94 of the banjo fitting 62. The sealing members 64 are positioned on opposite sides of the opening 80 and opposite sides of the annular hydraulic passageway 96. The sealing members 64 are also preferably made of a material that allows for the banjo fitting 62 to rotate about the shaft member 60.

As shown in FIG. 3, the banjo fitting 62 is disposed on the shaft member 60 adjacent to the banjo fixing flange 74 (a radially extending abutment flange). Further, the banjo fitting 62 is confined between the housing 40 of the hydraulic brake caliper assembly 26 and the banjo fixing flange 74 of the shaft member 60. Since the annular axial end faces 100 of the banjo fitting 62 are coated with a friction resistant material and the sealing members 64 are flexible and resilient, the banjo fitting 62 can rotate relative to the shaft member 60.

Second Embodiment

Figure 5:
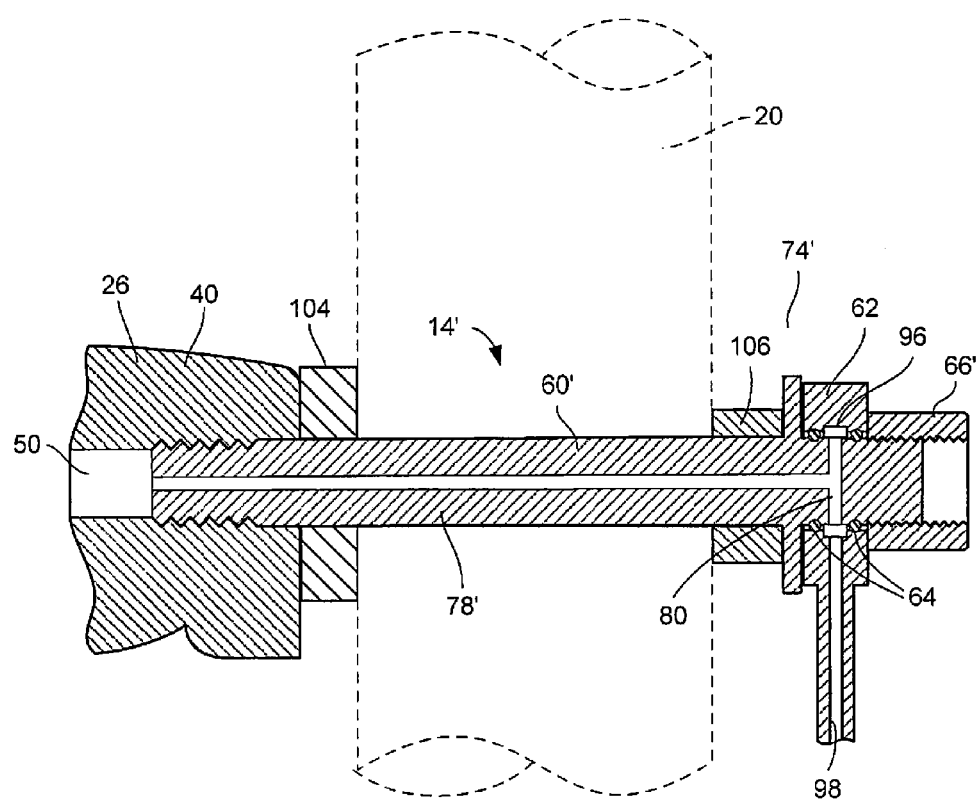
FIG. 5 is a cross-section of a portion of a hydraulic brake caliper and a hydraulic connector arrangement showing a shaft member and a banjo installed about the shaft member in accordance with a second embodiment.
Figure 6:
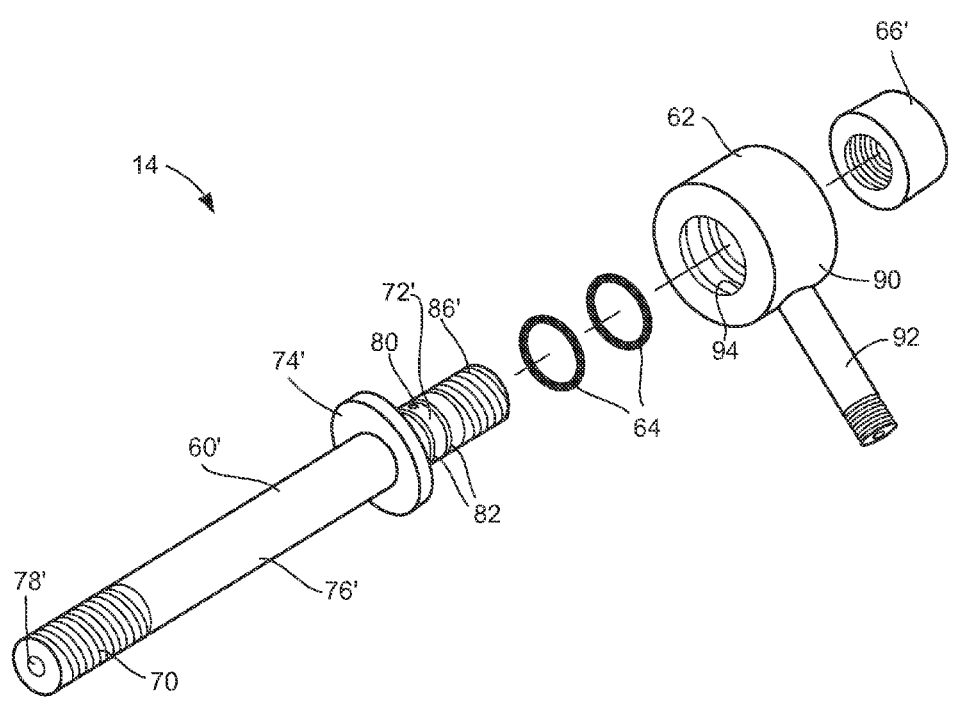
FIG. 6 is an exploded view of the hydraulic connector arrangement depicted in FIG. 5 shown removed from the bicycle and the hydraulic brake caliper, showing the shaft member, the banjo, seals and a fixing nut in accordance with the first embodiment.

Referring now to FIGS. 5 and 6, a hydraulic connector arrangement 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the shaft member 60 of the first embodiment is replaced with a shaft member 60'. However, in the second embodiment, the hydraulic brake caliper assembly 26, the frame member 20, and the banjo fitting 62 are the same as in the first embodiment. Additionally, spacers 104 and 106 are used in the second embodiment to position the hydraulic connector arrangement 14' and housing 40 of the brake caliper assembly 26.

The shaft member 60' includes the bicycle brake caliper supporting section 70 of the first embodiment, a banjo supporting section 72', a banjo fixing flange 74', a bicycle frame attachment section 76' and a hydraulic passageway 78'.

The banjo supporting section 72' is basically the same as the banjo supporting section 72 of the first embodiment, but is in a different location. Specifically, the banjo supporting section 72' includes the grooves 82 for retaining the sealing member 64 and the opening 80 located between the grooves 82. However, in the second embodiment, the banjo supporting section 72' is located between the banjo fixing flange 74' and a threaded axial end 86' of the shaft member 60'.

In the second embodiment, the banjo fixing flange 74' is located between the bicycle frame attachment section 76' and the banjo supporting section 72'. The bicycle frame attachment section 76 is located between the banjo fixing flange 74' and the bicycle brake caliper supporting section 70.

In the second embodiment, the hydraulic passageway 78' extends from the bicycle brake caliper supporting section 70, through the bicycle frame attachment section 76' and to the banjo supporting section 72'.

A fastener 66' replaces the fastener 66 of the first embodiment. Specifically, the fastener 66' is larger than the fastener 66 and is dimensioned to secure the banjo fitting 62' on the shaft member 60'. Consequently, the fastener 66' (a fixing nut) is threadedly installed to the shaft member 60' with the banjo fitting 62 being confined between the banjo fixing flange 74' (a radially extending abutment flange) and the fastener 66'.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the hydraulic connector arrangement. Accordingly, these terms, as utilized to describe the hydraulic connector arrangement should be interpreted relative to a bicycle equipped with the hydraulic connector arrangement as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic connector arrangement comprising:
   a bicycle brake caliper configured to attach to a bicycle frame adjacent to a bicycle wheel;
   a shaft member including a bicycle frame attachment section configured to extend through and attach to the bicycle frame, a banjo supporting section, a banjo fixing member configured to abut the bicycle frame and bicycle brake caliper supporting section attached to the bicycle brake caliper, the bicycle frame attachment section, the banjo supporting section and the bicycle brake caliper supporting section all being formed integrally as a single one-piece element, the bicycle brake caliper supporting section having a hydraulic passageway that extends from a distal end of the bicycle brake caliper supporting section to the banjo supporting section, the banjo supporting section having an opening that extends from the hydraulic passageway to an outer surface of the shaft member;
   a banjo fitting rotatably extending around the banjo supporting section of the shaft member covering the opening; and
   a first sealing member disposed between the shaft member and the banjo fitting and a second sealing member disposed between the shaft member and the banjo fitting at the banjo supporting section on the opposite sides of the opening, the outer surface of the shaft member including an annular surface that extends from the first sealing member to the second sealing member, the hydraulic passageway having an inner surface defining an inner diameter and the shaft member defining a wall thickness along the hydraulic passageway measured from the annular surface of the shaft member to the inner surface of the hydraulic passageway, the wall thickness being greater than the inner diameter of the hydraulic passageway,
   the banjo fixing member being located between the bicycle frame attachment section and the banjo supporting section retaining the banjo fitting to the shaft member, the banjo fixing member having an outer diameter greater than the bicycle frame attachment section and the banjo supporting section, the banjo fixing member being dimensioned to allow rotation of the banjo fitting relative to the shaft member and the banjo fixing member.

2. The hydraulic connector arrangement according to claim 1, wherein
the hydraulic passageway extends along a central axis of the shaft member.

3. The hydraulic connector arrangement according to claim 2, wherein
the opening extends perpendicularly from the hydraulic passageway.

4. The hydraulic connector arrangement according to claim 1, wherein
the bicycle frame attachment section is located adjacent to the banjo supporting section.

5. The hydraulic connector arrangement according to claim 4, wherein
the banjo supporting section is located between the bicycle brake caliper supporting section and the bicycle frame attachment section relative to the axial direction of the shaft member.

6. The hydraulic connector arrangement according to claim 1, wherein
the first sealing member and the second sealing member are O-rings.

7. The hydraulic connector arrangement according to claim 1, wherein
the banjo fitting includes an annular hydraulic passageway that encircles the shaft member and is open to the shaft member with the banjo member installed to the shaft member.

8. The hydraulic connector arrangement according to claim 1, wherein
the banjo fitting includes a hydraulic hose attachment section that extends in a direction perpendicular to an axial direction of the shaft member with the banjo fitting installed to the shaft member.

9. The hydraulic connector arrangement according to claim 1, wherein
the banjo fixing member includes a radially extending abutment flange that is disposed adjacent to the opening.

10. The hydraulic connector arrangement according to claim 9, wherein
the banjo fixing member is formed integrally with the shaft member as a single one-piece element.

11. The hydraulic connector arrangement according to claim 9, wherein
the banjo fitting is disposed adjacent to the radially extending abutment flange.

12. The hydraulic connector arrangement according to claim 1, wherein
the outer surface of the shaft member includes a pair of grooves with the first and second sealing members being disposed within the grooves, respectively.

13. The hydraulic connector arrangement according to claim 12, wherein
the annular surface having the uniform outer diameter extends from a first of the pair of grooves to the second of the pair of grooves.

* * * * *